United States Patent

[11] 3,591,735

[72] Inventor Fred A. Brooks
5 Emerson Gardens, Lexington, Mass. 02173

[21] Appl. No. 728,681
[22] Filed May 13, 1968
[45] Patented July 6, 1971

[54] ANALOG VOICE PROCESSING FOR A TRANSMISSION SYSTEM
2 Claims, 5 Drawing Figs.

[52] U.S. Cl. .......... 179/170.2, 179/1
[51] Int. Cl. .......... H04b 3/20
[50] Field of Search .......... 179/1, 170.2, 18

[56] References Cited

UNITED STATES PATENTS

| | | | |
|---|---|---|---|
| 2,266,531 | 12/1941 | Bedford .......... | 179/1 |
| 2,825,764 | 3/1958 | Edwards et al. .......... | 179/170.2 |
| 3,462,561 | 8/1969 | Deman .......... | 179/170.2 |

*Primary Examiner*—Kathleen H. Claffy
*Assistant Examiner*—Douglas W. Olms
*Attorneys*—Harry A. Herbert, Jr. and George Fine

ABSTRACT: Analog voice processing for a transmission system wherein the talker volumes applied to the transmission medium is regulated with a concurrent adjustment of the volume at a preselected level to secure a desired singing margin in the system.

INVENTOR.
FRED A. BROOKS

BY

George Fine
ATTORNEY

INVENTOR.
FRED A. BROOKS

BY

George Fine
ATTORNEY

INVENTOR.
FRED A. BROOKS

BY

George Fine
ATTORNEY

INVENTOR.
FRED A. BROOKS
BY
George Fine
ATTORNEY

INVENTOR.
FRED A. BROOKS
BY
George Fine
ATTORNEY

ANALOG VOICE PROCESSING FOR A TRANSMISSION SYSTEM

BACKGROUND OF THE INVENTION

Information in analog signals form are transmitted from talker to listener over radio, voice or carrier telephone wire line transmission circuits. The voltage and range of voltages applied to the transmission medium are generated in telephone subset transducer in response to sound pressures from talkers. The mean and range of volumes generated in subscribers circuits have been measured for a universe of two-wire antisidetone subsets in a commercial telephone system. It is assumed that military talkers with the two-wire or four-wire type 500 subset will generate the same distribution of volume, with possibly a little higher mean and require the same or better performance. The average volume at zero level for a normal talker of predominately two-wire type 302 subset is −15 vu (volume units) with a standard deviation (sigma) of 5.7 vu. An operating volume range for this distribution of 6 sigma or 34 vu is considered adequate in commercial systems. Peaks may exceed the root mean square (RMS) voltages in analog voice signals by 18 db. The total range of voltage from the lowest volume talkers negative peak to the highest volume talker positive peak is then 34+2×18 or 70 db. This range of voltages from a normal talker universe must be reproduced in the transmission medium if the signal voltages generated are to be delivered to a distant listener over a linear system.

If the entire signal range is to be transmitted without overload and distortion, with an adequate signal to noise ratio for a minimum talker, all other and higher volume talkers will have better signal to noise than required. The maximum plus peak voltage is 70 db. up on the negative peak of the minimum talker as indicated above. If the minimum volume talker RMS voltage requires a power of 0.001 watt to give a satisfactory signal to noise, the maximum talker must be transmitted so as to deliver 2.5 watts. The peak power would require 158 watts. The power range can be greatly reduced if only that portion of the signal containing essential information is transmitted. The volume difference between talkers is not essential to represent and reproduce the signal information in a single talker. Further, the intelligence information in the signal can be recovered from a transmitted signal with many db.'s of signal peak voltage removed.

Compandors have been used in commercial circuits to reduce the volume range transmitted. A complementary expandor at the receiving end of circuits restores the initial volume range. Thus, the expandor is arranged to complement the loss introduced by the compressor and maintain a constant net loss between terminals. With a constant net loss the signal range delivered is like the signal applied as to volume and peak voltage range except, for the degradation introduced in the compressor and expandor.

A volume regulator can be introduced in the analog signal circuit to regulate the volume to a nearly constant value. The regulator reduces the range of volumes transmitted and permits a higher average power for the same percent of time overloading occurs. This results in an improved signal to noise ratio for all talkers except the highest volume talker. Marginal low volume signals are transmitted at much higher volumes and all circuits meet a more uniform signal to noise requirement. With constant volume talkers a reduced range of RMS voltages are applied to the transmission medium. Maximum peak limiting can be applied to analog signals to obtain the same reduced peak to RMS ratio for all talkers without degrading the articulation performance of the system. Peak voltage in the signal above a limiting amplitude can be removed by means of baseband or carrier modulator limiters. Certain types of distortion generated in baseband limiters fall outside the transmitted band in modulator limiter, in addition, troublesome third order modulation products can be reduced if desired by applying feedback.

A range of 66 db. is indicated as the operating range for uncontrolled volumes and peak voltages. The part of the range due to volume changes can be removed by volume compression amplifiers (VC) or vogads. With volume compression amplifier or vogads the range can be reduced as desired, a 30 db. reduction in range can readily be obtained. Removing 30 db. of range reduces the variation to 4 db. With the proposed method of operating a complementing expandor is not required. Now if a modulator peak limiter is applied to reduce the peak voltage relative to the RMS by 8 db., the signal left will have peaks of 10 db. Peak limited signals can be applied to the medium at a higher volume to obtain the same percent of the time overloading takes place to improve the signal to noise ratio. The total signal range is then reduced to 10+10+4 or 24 db. Experimental tests indicate satisfactory quality and articulation performance with this voltage range.

In order to apply constant volume regulation to commercial circuits, certain changes must be made in the equipment and method of operation. Present commercial circuits are lined up to have constant net loss. A test signal of 1 milliwatt is applied at a 0 db. level or equivalent point at circuit input to adjust the circuit gains and losses. The level at all other significant circuit locations beyond the point of application are specified as gain (+) or loss (−) relative to 0 db. level and represent the level at the location measured. A milliwatt of 1000 cycles was arbitrarily chosen to represent the varying analog voice signal voltage at 0 db. level.

In linear transmission systems measures of performances are the percent of time overloading takes place and the signal to noise delivered. The system response depends upon the analog signal characteristics. For a particular system overloading is reduced by regulating the volume of the signal applied. We can use percent of the time overloading occurs as a measure of the improvement in system performance obtained by regulation of peak limiting. The volume can be raised to improve the signal to noise in a particular system by the difference in load capacity required for the relative conditions plus the amount the peaks are reduced relative to the mean power. Repeaters in wire lines are spaced at intervals in the line so that a minimum talker will meet the noise requirement and the highest volume talker will not overload the circuit for more than a small percent of the time. With this lineup and with volumes applied at random the system accommodates the entire range of talkers. In order to regulate talker volumes without introducing gain changes all talker signals will be regulated to minimum volume by introducing loss. The minimum volume chosen depends upon the relative response of the subset to a talker sound pressure and the required listening volume to the individual receiver. All talkers above the lineup volume will be regulated by introducing loss, but to raise the minimum to the desired system volume a fixed gain is required after the regulator. Additional gain cannot ordinarily be included in either two-wire/four-wire or four-wire circuits since singing margin and return losses may be inadequate.

In order to overcome singing margin and return loss limitation, constant volume regulation will be obtained by adjusting fixed circuit gains at minimum volume which gives adequate minimum listening volume, singing, and return loss margins. With minimum volume applied the gain of the regulator will be constant and its fixed gain can be adjusted to deliver the desired system volume. A compensating fixed loss at the receiving terminal reduces the circuit gain to a loss to meet singing margins. The receiving loop is adjusted to deliver preferred listening volume. If additional no-load singing margin is required an expandor can be included in the signal circuit. This expandor must introduce a large loss in two-wire/four-wire circuits below normal input. The return signal from the distant end and the loss must be removed rapidly whenever the circuit becomes active. The expandor acts to limit the circuit noise as well as to increase the singing margin or return loss.

Variations of signal volume at the receiving circuit output represent changes due to applied signal volume and instability of the net loss in transmission medium. The variation of applied volume can be removed by the application of a transmitting expandor and volume regulator or volume regulator only. Signal volume as used here refers to the received signal after it comes through various circuits in radio or wire line transmission medium. Applied volume refers to the volume at the sending end of the medium. Variations in the medium carrier systems are the result of mismatch between equalization and the medium loss and to inaccuracies in regulation. These variations for wire lines indicated by the change in net loss follows a log normal distribution with a standard deviation of 4.7 db. The change in net loss produces about two-thirds the volume variation at the end of long haul circuits as for various talkers from a subset. Any decrease in net loss (increased gain) decreases singing margins in two-wire/four-wire circuits and return loss in four-wire systems. A constant volume at the receiver output can be obtained for a constant volume applied by introducing a compression regulator and a high rate of change expandor or compressor only, similar to the arrangement used at the transmitting station. The combination will regulate the output by adding loss in proportion to increased volume and the expandor adds loss as the volume drops below a threshold. Thus, maintaining a constant received volume, improves a singing margins and return loss attenuation.

The present method of adjusting two-wire/four-wire transmission circuits using type 302 subsets is as follows: the mean transmission volume of the 302 subset is assumed to be −15 vu at 0 db. level. Preferred listening volume is assumed to be −25 vu the subset input, but to improve the singing margin, the circuit toward the listener is adjusted to deliver −31 vu. With −15 vu input to the transmitting hybrid the input to the output hybrid must be −27 vu in order to deliver the desired volume of −31 vu to the listener subset.

The net loss from input subset to receiving subset input is thus 16 db. In order to obtain 8 db. loss between hybrids, a pad at the input must be adjusted to apply system volume to the medium and a pad from +7 db. level of receive amplifier output to output hybrid input in long haul circuits, must be adjusted to −12 db. level. A pad of 12 db. is available at the "input" and 19 db. is available at receiving amplifier output. Net loss is then 16 db. If we assume a 4 db. loss across each hybrid, minimum transmission loss around the loop is 24 db. for a mean net loss of 16 db., one way, between subsets.

Table 1 shows the return loss for various "lineup" volumes in two-wire/four-wire transmission systems using WE Model Type 302 or 500 subsets for typical received volume. It should be noted that as the lineup volume at 0 db. level is decreased round trip singing margin (loss) is decreased. Table 1 is as follows:

TABLE 1.—SINGING MARGIN VS. LINEUP VOLUME FOR CONSTANT VOLUME OPERATION

| Vol. at 0 level, −VU | Trans. gain (+) or loss (−), db | One way gain (+) or loss (−) Hyb out −Hyb in, pre. list. vol. | | | Round trip singing mar. gain (+) or loss (−), pref. list. vol. | | |
|---|---|---|---|---|---|---|---|
| | | −24 | −29 | −33 | −24 | −29 | −33 |
| −34.0 | +6.0 | 17 | 12 | 8 | +28 | +18 | +10 |
| 32.0 | +4 | 15 | 10 | 6 | 24 | 14 | 6 |
| 30.0 | +2 | 13 | 8 | 4 | 20 | 10 | 2 |
| 28 | 0 | 11 | 6 | 2 | 16 | 6 | −2 |
| 26 | −2 | 9 | 4 | 0 | 12 | 2 | −6 |
| 24 | 4 | 7 | 2 | −2 | 8 | −2 | −10 |
| 22 | 6 | 5 | 0 | −4 | 4 | −6 | −14 |
| 20 | 8 | 3 | −2 | −6 | 0 | −12 | −18 |
| 18 | 10 | 1 | −4 | −8 | −4 | −14 | −22 |
| 16 | 12 | −1 | −6 | −10 | −8 | −20 | −26 |
| 14 | 14 | −3 | −8 | −12 | −12 | −22 | −30 |
| 12 | 16 | −5 | −10 | −14 | −16 | −26 | −34 |
| 10 | 18 | −7 | −12 | −16 | −20 | −30 | −38 |
| 8 | 20 | −9 | −14 | −18 | −24 | −34 | −42 |
| 6 | 22 | −11 | −16 | −20 | −28 | −38 | −46 |
| 4 | 24 | −13 | −18 | −22 | −32 | −42 | −50 |
| 2 | 26 | −15 | −20 | −24 | −36 | −46 | −54 |
| 0 | 28 | −17 | −22 | −26 | −40 | −50 | −58 |
| 2 | −30 | −19 | −24 | −28 | −44 | −54 | −62 |

Transmission lineup using WE Co. 500 Type subsets is the same as for the 302 subsets. The transmitting volume for the subset is assumed at −13 vu mean at 0 db. level and the listening volume is −30 vu mean, which is also approximately the preferred volume. The applied volume is 2 db. higher and the received volume is 1 db. higher to increase singing margin to 24 db. Minimum, mean and maximum transmitting volumes in either direction at 0 db. level are −30, −13, and +4 vu respectively. With 24 db. singing margin at lineup, a minimum singing margin of 10 db. is obtained at minimum net loss. A more sensitive transducer and a 1 db. higher lightening volume gives an improved singing margin of 2 db. The margin for various lineup volumes are shown in the following Table 2:

TABLE 2.—SINGING MARGIN VS. LINEUP VOLUME FOR CONSTANT VOLUME OPERATION

| Vol. at 0 level −VU | Trans. Gain (+) or Loss (−) | One way Gain (+) or Loss (−) pref. list. vol. | | Round trip singing mar. Gain (+) or Loss (−), pref. list. vol. | |
|---|---|---|---|---|---|
| | | −29 | −33 | −29 | −33 |
| −34 | 6 | 12 | 8 | +18 | +10 |
| 32 | 4 | 10 | 6 | +14 | +6 |
| 30 | 2 | 8 | 4 | +10 | +2 |
| 28 | 0 | 6 | 2 | +6 | −2 |
| 26 | −2 | 4 | 0 | +2 | −6 |
| −24 | −4 | 2 | −2 | −2 | −10 |
| 22 | −6 | 0 | −4 | −6 | −14 |
| 20 | −8 | −2 | −6 | −10 | −18 |
| 18 | −10 | −4 | −8 | −14 | −22 |
| 16 | −12 | −6 | −10 | −18 | −26 |
| 14 | −14 | −8 | −12 | −22 | −30 |
| 12 | −16 | −10 | −14 | −26 | −34 |
| 10 | −18 | −12 | −16 | −30 | −38 |
| 8 | −20 | −14 | −18 | −34 | −42 |
| 6 | −22 | −16 | −20 | −38 | −46 |
| 4 | −24 | −18 | −22 | −42 | −50 |
| 2 | −26 | −20 | −24 | −46 | −54 |
| 0 | −28 | −22 | −26 | −50 | −58 |

SUMMARY OF THE INVENTION

The volume and level the voltage generated in analog telephone subset circuits in response to talker sound pressures covers a wide range. The present invention increases the signal to noise ratio in transmission circuits by reducing the range of voltages from various talkers and applies a constant volume to the voice channels. In order to regulate the volume without decreasing the two-wire/four-wire singing margin the circuit is adjusted for either minimum volume or somewhat higher volume to secure the desired singing margin for the subsets used. For higher volumes, the volume control reduces the volume applied by inserting loss to maintain a constant input to the transmission medium. Volume control is applied in the transmitting circuit and may also be applied in the output of the transmission path. A receiving compressor nullifies some of the variations introduced by the transmission medium. An expandor may be used at one or both ends of the circuit to reduce idle circuit noise and improve singing margins or return loss.

When the applied signal is above a minimum talker or the system lineup volume, the signal delivered to the receiving subscriber is at constant preferred volume. If the relative sensitivities of the transmitter and receiver do not permit regulation of all talkers and meet singing margins, those talkers with volumes below lineup volumes will be unregulated.

Although the subset limits the minimum volume regulated, the system performance is improved many db., since all talkers are applied to the transmission medium at higher volumes than for most unregulated volumes. With a given amplifier or system a constant applied volume can be transmitted at a higher mean volume to obtain system overloading the same percent of the time as for uncontrolled volume talkers.

Thus the present invention regulates talker volumes applied to the transmission medium permitting higher mean signal power and resulting in improved signal to noise performance. The circuit net loss is controlled by introducing loss at the receiver whenever the circuit net loss decreases more than the applied volume is allowed to vary. There is also included means to reduce the peak voltage of the constant volume talkers applied to the transmission medium. It is noted that the signal to noise performance is improved by applying constant volume to transmission systems by introducing loss above the lineup volume as to hold the applied volume constant or as required.

An object of the present invention is to provide an analog voice transmission and reception system which regulates all applied volumes to a constant volume or as desired.

Another object of the present invention is to provide an analog voice transmission and reception system wherein circuit net loss is controlled by introducing loss or gain at the receiver whenever the circuit net loss decreases or increases more than the applied volume is allowed to vary.

Another object of the present invention is to provide an analog voice transmission and reception system which includes means to reduce the peak voltage of the constant volume talkers over the transmission medium.

The various features of novelty which characterize this invention are pointed out with particularity in the claims annexed to and forming part of this specification. For a better understanding of the invention, however, its advantages and specific objects obtained with its use, reference should be had to the accompany drawings and descriptive matter in which is illustrated and described preferred embodiments of the invention.

DESCRIPTION OF THE PREFERRED EMBODIMENTS

Figure 1:
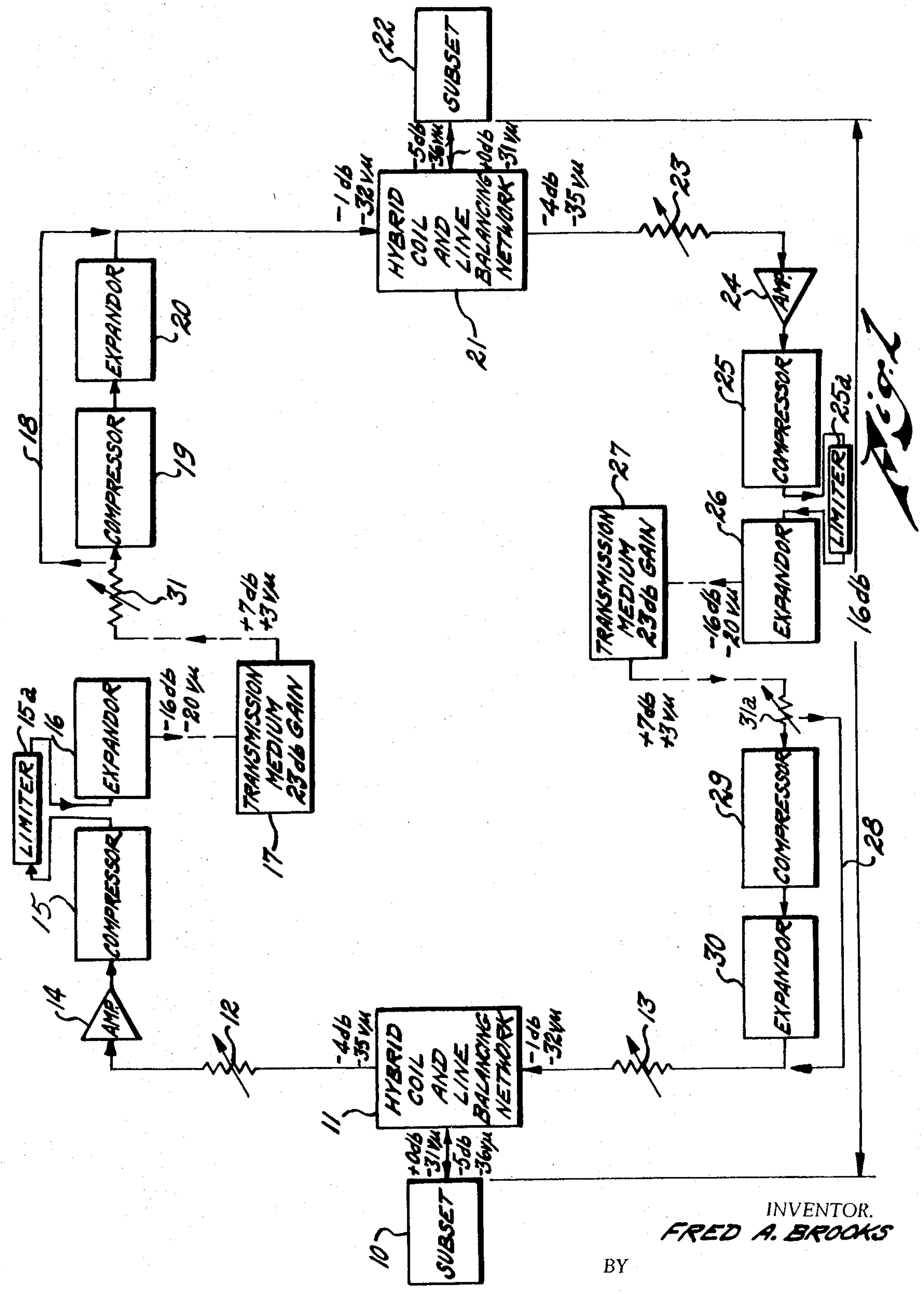
FIG. 1 shows one preferred embodiment of the invention for a two-wire analog voice transmission and reception system.

Now referring to FIG. 1, there is shown a two-wire transmission and reception system utilizing a 500 type Western Electric Co. subset 10 (a subset being the conventional telephone apparatus including a microphone and earphone). Subset 10 provides at its output an electrical signal representative of a talker's speech. The subset output is assumed to be 0 db. as a reference. Actually it is −15 volume units (vu) as measured on a standard volume indicator which is a meter utilized in conventional telephony and is manufactured by Western Electric Co. The aforementioned volume meter has a preselected response and damping characteristic and is calibrated in volume units (vu). The output of subset 10 is −15 vu. Subset 10 provides an input signal to hybrid coil with a line balancing network 11 which divides the signal into two parts, the first going to adjustable resistor pad 12 and the second to adjustable resistor pad 13. The second signal is completely dissipated and the first is attenuated by adjustable resistor pad 12 and then applied to amplifier 14. Adjustable resistor pad 12 and amplifier 14 are adjusted to provide a preselected average magnitude signal to compressor 15. Pad 12 and amplifier 14 are used in combination in the event subset 10 does not provide the desired average output.

Compressor 15 receives a predetermined input and operates to reduce the range of volumes for application to expandor 16. Compressor 15 is required to have a certain maximum gain. Compressor 15 may be the conventional type such as a regulated amplifier in which the output is measured and the gain is automatically adjusted in accordance therewith to provide a constant volume. This type of compressor is also referred to as volume compression amplifiers (VC) or Vogads which operates on the comparatively long time average power in the applied voice signal to make all talkers deliver approximately the same mean power while leaving the ratio of peak to RMS voltages substantially the same. This constant volume, as universally understood in the art, means that the mean power is fixed. This type of compressor may be such as described in Western Electric Instruction Bulletin No. 1116 and entitled A-2 Vogad. Limiter 15*a* receives the output of compressor 15 and is utilized to remove excess peaks from the voice signal.

Expandor 16 receives the limited signal from limiter 15*a*. Expandor 16 has a fixed minimum loss to the signal applied thereto and when the signal ceases the loss in the expandor rises to furnish automatically a portion of the singing margin when the signal is not present, thus expandor 16 operates to control the singing margin at minimum volume. Expandor 16 provides at its output a signal for application to transmitting medium 17. This signal has been carefully controlled as to magnitude so that at the input of transmission medium 17 there is the required constant volume. The transmission medium may be a conventional carrier voice modulated or may be long haul telephone lines or any such conventional voice transmission means. The transmission medium is provided with a predetermined gain.

As the receiver portion of the system, the transmission medium provides the requisite signal which is comprised of the electrical signal representative of speech (in the event there is a modulated carrier, this is detected in the carrier system). The speech signal may be fed directly to hybrid coil and line balancing network 21 by way of conducting path 18. Hybrid coil and line balancing network 21 is identical to hybrid coil and line balancing network 11. The speech signal is delivered to subset 22 which is identical to subset 10. In the alternative the speech signal received by way of transmission medium 17 may be applied to subset 22 by way of compressor 19 and expandor 20. Compressor 19 and expandor 20 are identical to compressor 15 and expandor 16, respectively. Compressor 19 takes out the variabilities introduced by the transmission medium (such as increased loss or gain). Direct connection by way of conducting path 18 is utilized when the loss is lined up in consideration of past standard. The additional compressor 19 and expandor 20 are utilized, in the alternative, when it is desired to deliver a more constant received volume or a constant net loss as desired between the input at subset 10 and the output at subset 22. The compressors may be made to have an 8 to 1 ratio, and the expandors a 2 to 1 ratio to provide an overall 4 to 1 ratio for the receiving system.

It is noted that FIG. 1 includes notations as to the magnitude of volume units (vu) and loss and gain in db. from subset 10 to subset 22 and from subset 22 to subset 10. This is generally referred to as the lineup volume for constant volume operation which is in accordance with hereinbefore tabulated Table 1.

The corresponding message or speech signal from subset 22 to subset 10 is provided by way of hybrid coil and line balancing network 21, adjustable resistor pad 23, amplifier 24, compressor 5, limiter 25*a*, expandor 26, transmission medium 27, receiving pad 31*a*, compressor 29, expandor 30 (or in the alternative to compressor 29 and expandor 30, conducting path 28), adjustable resistor pad 13 and hybrid coil and line balancing network 11 to subset 10. It is emphasized that the components and mode of operation from subset 10 to subset 22 is identical to that of the components from subset 22 to subset 10.

Lineup for constant volume two-wire operation requires the addition of an adjustable pad 12 and amplifier 14 to drive the compressor 15 (volume control (VC) amplifier). Amplifier 14 and pad 12 are used to adjust, for example, the volume of the lineup talker volume (may be as low as −30 vu at 0 db. level) to the desired system volume (may be as high as −10 vu at −16 db.) and at the same time adjusts the output to the lowest volume of the compressor regulating range. All higher volumes of talkers will be reduced by the compressor to maintain the desired volume. The desired volume can be adjusted 10—18 db. higher than without regulation. This increase in volume is permitted since the volume is uniform for all talkers. Peak load required is 6 and 8 db. lower with regulated talkers and 8 db. of peak limiting respectively. Volumes applied from 500 type subset 10 for a minimum sound pressure talkers are shown in FIG. 1. Received volumes for the gain and losses shown are given. First, assuming the net loss has a standard deviation of 4.7 as measured and second, that the net loss variation has been reduced by improved maintenance to meet the variation specified for Autovon that is 4.1 db. for a standard deviation of 1.4 db. An optional receiving expandor and compressor are shown in FIG. 1. This combined circuit introduces loss when the received signal is below a threshold. If the minimum received volume for minimum lineup volume with constant volume applied is expected to be no more than 4.1 db. low an adjustable gain is set to introduce 4.1 db. gain to compensate for increased transmission loss. Thus, an increased receiving volume is obtained when the circuit has minimum loss, as the volume increases above this minimum, the regulator introduces a compensation loss to hold the volume constant. When the circuit becomes idle, expandor 16 introduces extra loss to give a larger positive singing margin and reduces background noise.

It should be noted that with a compressor at the transmitting terminal to give constant volume operation, a compressor at the receiver will permit two-wire circuits to be lined up for lower net loss. This is possible since the compressor nullifies increases in circuit gain to maintain a fixed net loss at minimum volume and the expandor introduces high loss when the circuit is idle. When both talkers are active at once, the compressors introduce loss to maintain margins. For normal operation, this circuit can be lined up to provide singing margin desired by raising the lineup volume. Volumes, below the lineup volume, will not be regulated but will drop when the applied volume drops and must not be permitted to drop below listener's threshold.

Figure 2:
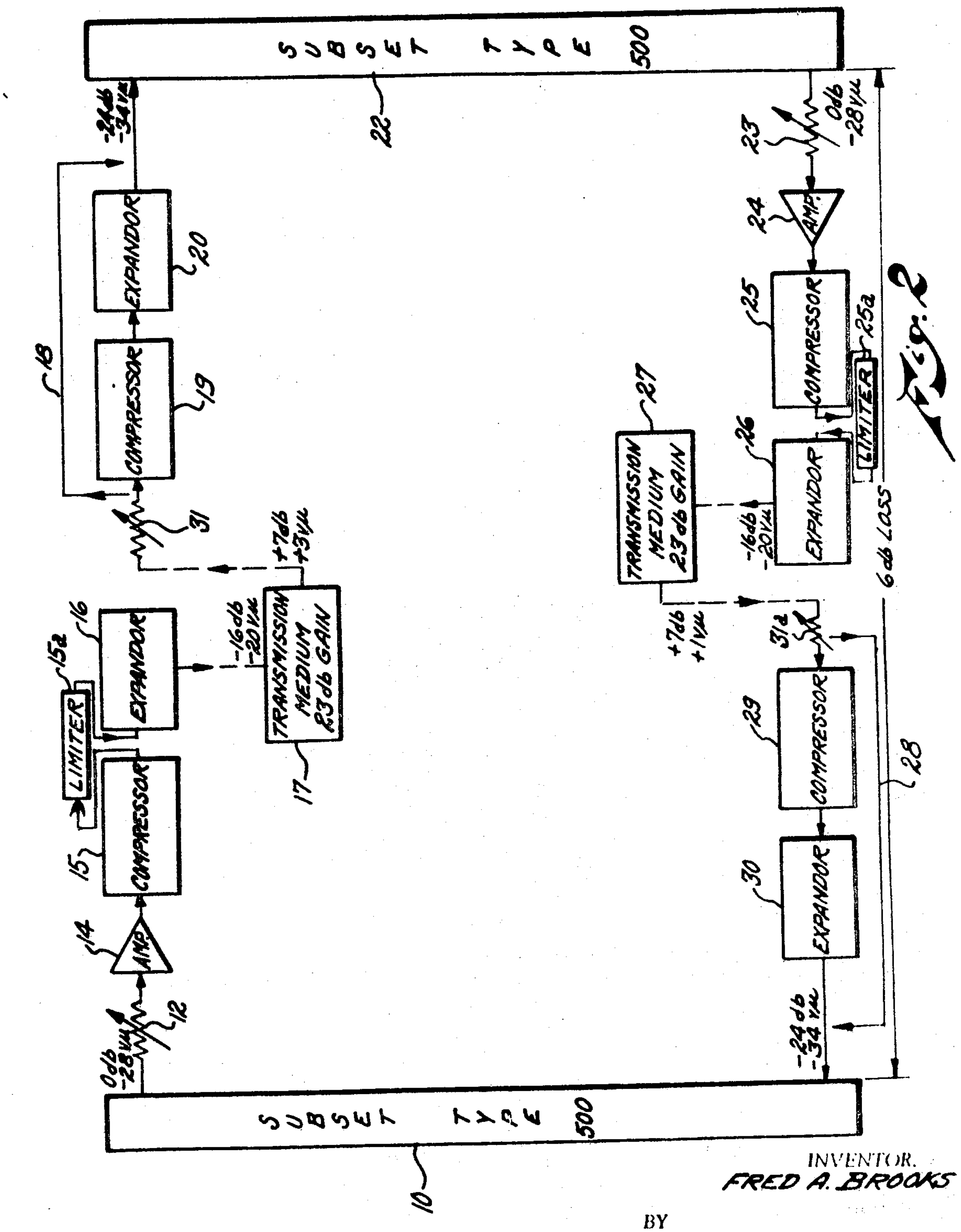
FIG. 2 shows a second preferred embodiment of the invention for a four-wire analog voice transmission and reception system.

Now referring to FIG. 2 which is a four-wire circuit, it is identical to the system of FIG. 2 with the hybrid coils and line balancing networks 11 and 21 omitted and a four-wire 500 type subset substituted for the two-wire 500 subset and the addition of pad 31. The equipment and circuits using the type 500 subset for constant volume operation in four-wire circuits are shown in FIG. 2. The use of operational expandor 16 will depend upon the circuit net loss desired. Optional receiving compressor 19 and expandor 20 are shown. The expandors improve the listening conditions during idle time by inserting a high loss to eliminate input or output noises. The 500 type four-wire subset is assumed 4 db. more sensitive in transmitting and the preferred listening volume is considered to be −34. With four-wire circuits and the 500 subset, it is assumed that return losses will not be controlling.

Figure 3:
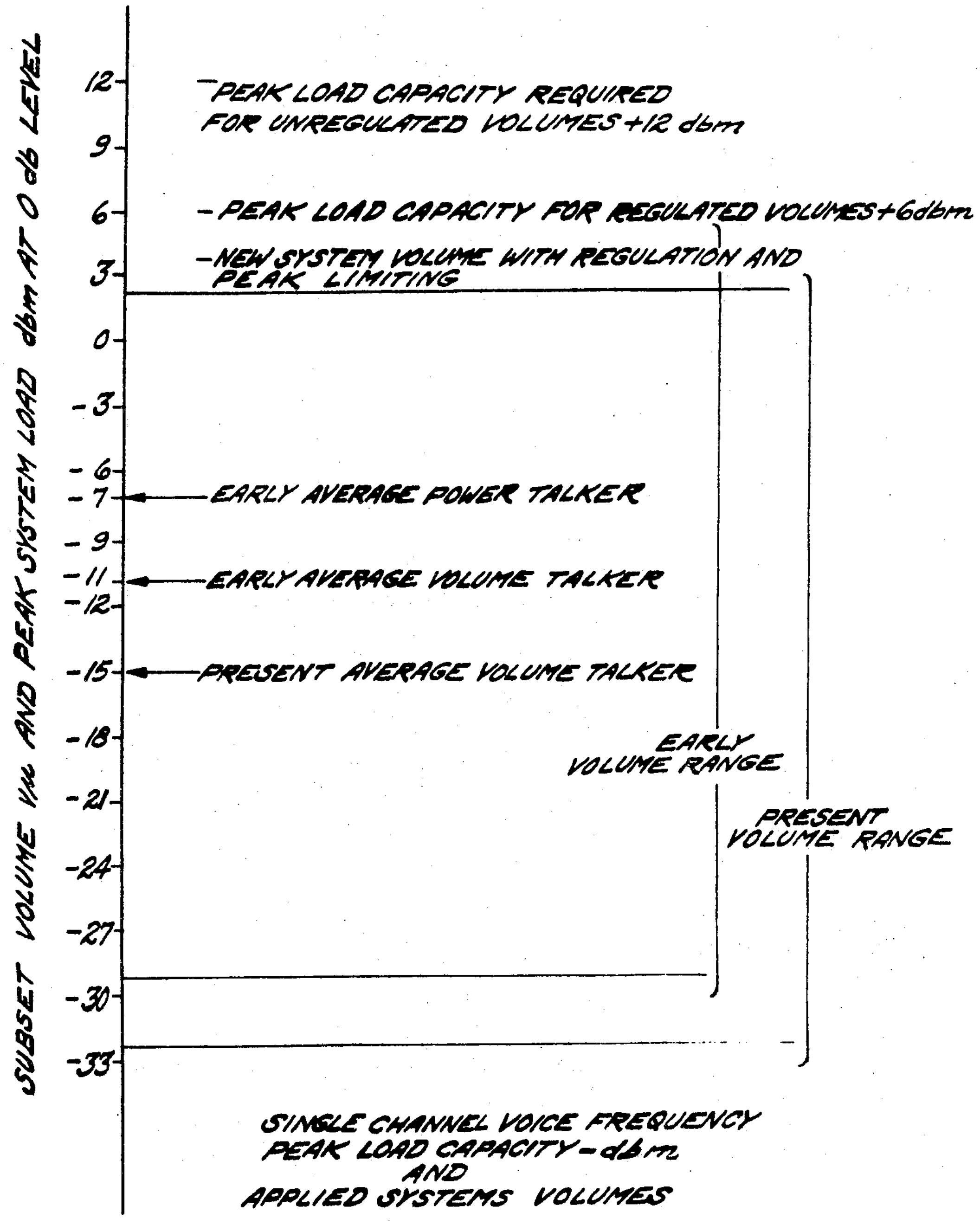
FIG. 3 shows curves of single channel peak load capacity and applied system volumes.
Figure 4:
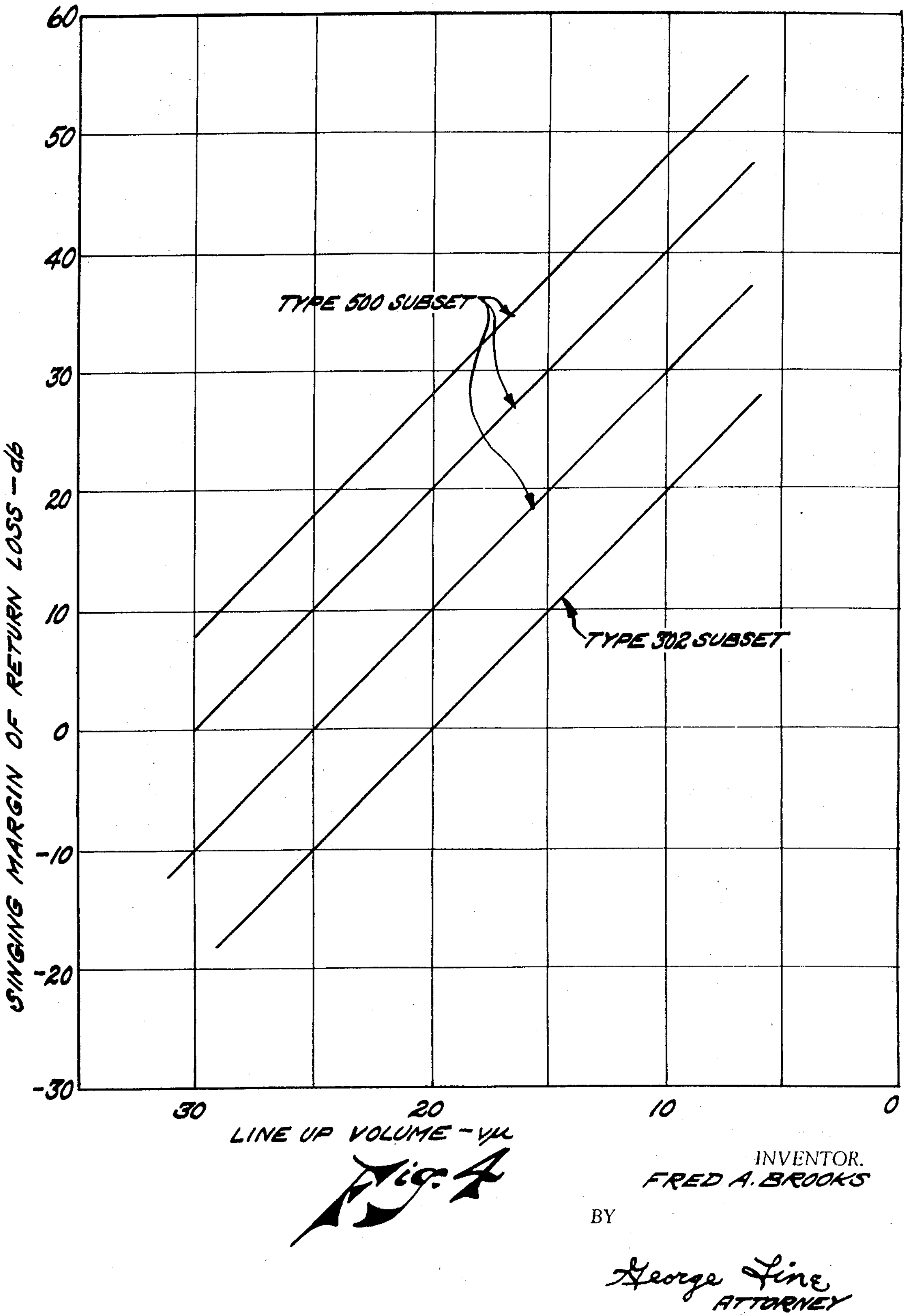
FIG. 4 shows curves for singing margin or return loss against lineup volume.

The minimum subset volume output is shown as −28 vu. This output is passed through adjustable pad 12, amplifier 14, compressor 15, limiter 15*a*, and expandor 16 if required are shown at the transmitting end of the circuit. With a subset output of −28 vu a gain is required to increase the volume to a new system volume (see FIG. 3 for volume applied). An increase of 6 db. in FIG. 3 illustrates an increased volume which can be transmitted over a transmission medium designed for unregulated volumes. Higher volumes can be applied to obtain additional improvements by applying peak limiting to the regulated signal and increasing regulated volumes to obtain the same percent overloading. With −28 vu from the subset, an additional gain of 8 db. is required to raise this volume to the new system volume of 20 vu at −16 db. level. This raises system operating volume by 6 db. above normal volume for unregulated signals. With constant volume, all volumes which would have been transmitted below this volume will have improved signal to noise performance. At the receiver the volume is delivered 6 db. up on the usual volume. The receiving pad 31 may be increased by 6 db. to maintain the desired net loss. Lineup in the reverse direction is accomplished in the same manner. Return loss margins as a function of lineup volume from the subset for various mean telephone set volumes are shown in Table 3. Singing margin or return loss for Type 302 and 500 subsets are shown in FIG. 4. Table 3 is as follows:

TABLE 3. W.E. #500 TYPE SUBSET RETURN LOSS VS. LINE-UP VOLUME FOR CONSTANT VOLUME OPERATION

| Vol. at 0 level, VU | Trans. gain, db | One way Gain (+) or Loss (−), listening volumes, VU | | | Round trip return loss exclusive of hand set, listening volumes, VU | | |
|---|---|---|---|---|---|---|---|
| | | −30 | −32 | −34 | −30 | −32 | −34 |
| 34 | +2 | | | | | | |
| 32 | −0 | +2 | 0 | −2 | +4 | 0 | −4 |
| 30 | −2 | 0 | −2 | −4 | 0 | −4 | −8 |
| 28 | −4 | −2 | −4 | −6 | −4 | −8 | −12 |
| 26 | −6 | −4 | −6 | −8 | −8 | −12 | −16 |
| 24 | −8 | −6 | −8 | −10 | −12 | −16 | −20 |
| 22 | −10 | −8 | −10 | −12 | −16 | −20 | −24 |
| 20 | −12 | −10 | −12 | −14 | −20 | −24 | −28 |
| 18 | −14 | −12 | −14 | −16 | −24 | −28 | −32 |
| 16 | −16 | −14 | −16 | −18 | −28 | −32 | −36 |
| 14 | −18 | −16 | −18 | −20 | −32 | −36 | −40 |
| 12 | −20 | −18 | −20 | −22 | −36 | −40 | −44 |
| 10 | −22 | −20 | −22 | −24 | −40 | −44 | −48 |
| 8 | −24 | −22 | −24 | −26 | −44 | −48 | −52 |
| 6 | −26 | −24 | −26 | −28 | −48 | −52 | −56 |
| 4 | −28 | −26 | −28 | −30 | −52 | −56 | −60 |
| 2 | −30 | −28 | −30 | −32 | −56 | −60 | −64 |
| 0 | −32 | −30 | −32 | −34 | −60 | −64 | −68 |

If the compressor and expandor respond equally to analog speech and 1000 cycle power either signal can be used to make the lineup and adjustment of system. For convenience in measuring and adjusting the circuits 1000 cycle power of appropriate amplitude will be used. The power applied depends upon characteristics of the system including the compressor and expandor as well as the transmitting power from the subset and the preferred listening volumes or source and sink of the signal voltage. These transmission circuits which include compressors and expandors must be lined up for a particular power for which the lineup loss meets the overall system net loss requirement. For example, if a net loss of 0 db. is required for four-wire trunk circuits including compressor and expandor the power applied must be at lineup volume which is set at the lower edge of the compressor's range. If all applied volumes are to be regulated and the minimum volume is −28 vu, this is the volume to be delivered at the receiver terminals at the distant end to give a net loss of 0 db.

The transmission circuits beyond the transmitting compressor and expandor remain unchanged between a −16 db. level point at the transmitter and the +7 db. level point at transmitting medium output. A pad between this point and receiving compressor and expandor output, if specified, may be adjusted to deliver the required volume to the 0 db. level point.

The desired singing margin in two-wire/four-wire systems is determined by the relative minimum transmitting and the preferred listening volumes in the subset as well as the net loss adjustment. The relative volumes are then an important consideration in designing a satisfactory communication system. The desired relationship should be specified to reduce the number of talkers below lineup volume, reduce the range of received volumes, and improved signal to noise for low volume talkers. If a loss is permitted between the minimum volume out of the subset and the preferred listening volume, a positive return margin can be obtained in all two-wire/four-wire circuits. The difference in transmitted and received volume must be increased by 8 db. to allow for the gain required to overcome the loss introduced by the two hybrid coils in two-wire circuits to obtain a positive margin. If the listening volume exceeds the minimum talker volume, the transmission circuit must be adjusted at a volume which will furnish a net loss between the transmitting volume and preferred or adjusted listening volumes. Signals below lineup volume drop and higher volumes are regulated. When regulation cannot be provided for all talker volumes, singing margin must be provided in two-wire systems for the expected increase in gain to the extent of the unregulated net loss.

Volumes in the Bell System are adjusted for mean and either higher or lower volumes will be received for corresponding inputs. If the proper relationship between minimum transmitted and preferred listening volume are obtained, all volume variation due to differences between talkers can be eliminated by compression circuits. The volume transmitted will be more uniform to reduce; first, the variation between talkers which causes cross-modulation in carrier transmission circuits and interchannel crosstalk in cables; second, listening volumes are more uniform, at preferred volume; third, since all volume talkers below the maximum are transmitted at higher volumes, the signal to noise performance of these talkers are improved; fourth, constant volume received increases the proportion of the circuits rated "Good"; fifth, if the relationship suggested is obtained, minimum volume lineup can be used, all talkers signals will be regulated to constant volume; sixth, when circuits of constant volume are interconnected with conventional circuits constant volume will be transmitted to the variable volume circuits and volumes received from these circuits will be regulated to a constant volume in the system.

Figure 5:
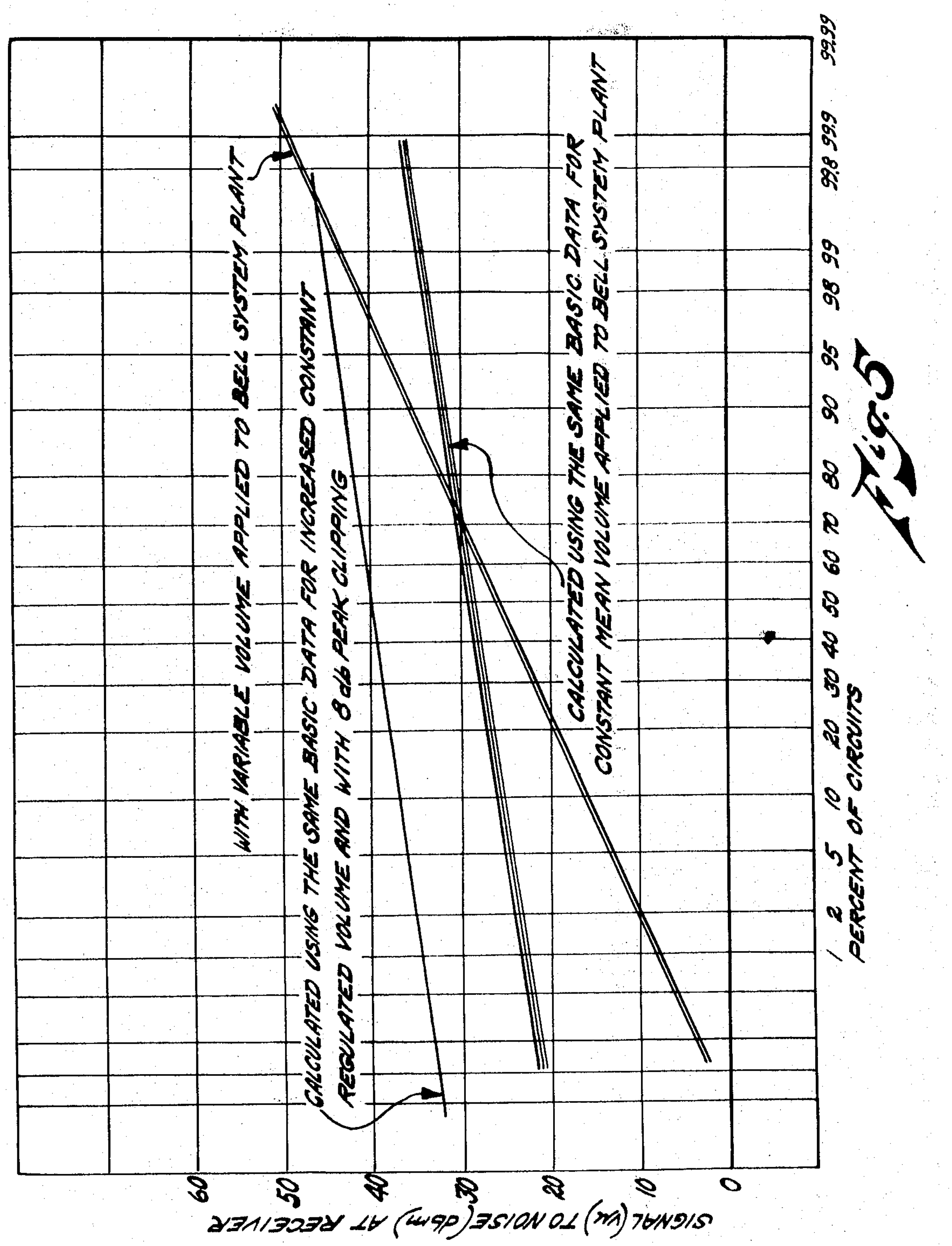
FIG. 5 shows curves of accumulative signal (vu) to noise (dbm) distribution.

Performance of long haul transmission circuits with variable and constant volume applied assuming, all talker volumes can be regulated and transmitted at mean or increased volume in Bell System circuits are shown in FIG. 5. The improvements are in all circuits delivered to the medium at higher volumes. With variable volumes applied, 1 percent of all circuits in the long haul plant have less that 8 db. signal to noise. These circuits are improved 20 db. or more with constant mean volume operation assuming constant received level. The improvement shown in curve 2 of FIG. 5 represents only a fraction of the improvement which can be obtained from the application of constant volume operation. With the addition of peak clipping the lower peaks of higher constant volume signals can be applied to obtain additional signal to noise performance. The addition of peak limiting may decrease the peaks by as much as 8 db. The peak limited signal can then be transmitted over the system with 8 db. of increased volume and hence improve signal to noise for the same percent overloading.

Peak voltage load capacity for a constant volume signal is 6 db. lower than for unregulated signals. This means that the regulated signal peaks are down 6 db. on unregulated signals operating at the same power at 0 db. level. A system designed to carry unregulated signals can carry a regulated signal with 6 db. more power for the same percent of the time overloading takes place.

When the net loss of a transmission circuit varies the volume delivered to the listener will also vary. This variability can be removed in constant volume circuits by first applying a compressor such as a VC amplifier or Vogad and expandor in the four-wire circuit at the receiver in either two-wire or four-wire systems as shown in FIGS. 1 and 2. The expandor reduces the noise during idle conditions. The combination is lined up for the minimum received volume and minimum loss by adjusting the gain just below the regulating range to deliver the expected constant volume from the combination. For this adjustment, the received gain nullifies the circuit loss to give the initial singing margins or return loss obtained for the desired relationship of listening volume to minimum transmit volume. When the received volume drops below lineup volume and below the minimum unregulated volume a large loss will be introduced by the expandor. For a db. drop in input signal below minimum nonregulated volume, loss shall increase by at least $n$ db. where $n$ is large. This increases singing margin in idle circuits. For volumes above the minimum in either direction, singing margins or return losses increase as the volumes are increased approximately db. for db. This arrangement reduces the net loss variation due to line circuits and maintains singing margins or return loss margins.

In adjusting the four-wire terminating circuits, it is assumed the transducer will deliver 2 db. more output volume and the receiver sensitivity is 4 db. higher than when the same subset is used for two-wire operation. Thus, mean sound pressure will deliver −11 vu of analog signals and have the same standard deviation for various talkers. A minimum talker will then deliver −28 vu into 600 ohms to the gain adjusting pad. Assume first the expandor is omitted. With −28 dbm of 1000 cycles applied assuming that the regulator responds the same to 1000 cycle power and analog voice signals of equal power at transmission system input adjust amplifier pad to give the lowest volume within the operating range of the compressor. Increase the 1000 cycle power by 34 db. The compressor output should be substantially independent of the applied power or increase as required. In the receiving direction toward the listener adjust the power to obtain the preferred listening volume of −34 dbm by means of the receiving pad. With the expandor connected and with −28 dbm of 1000 cycle power applied to the four-wire input adjust the amplifier pad to obtain the lowest volume output of the compressor within the operating range. Increase the applied signal by a portion of the regulating range and check that the output remained substantially constant or as required. The receiving side of the terminating set is adjusted the same as without the expandor.

Improvement in circuit performance obtained by applying constant volume signals to transmission circuits is particularly desirable in high power radio transmitters to reduce the power and in wire circuits to reduce the number of repeaters in the line circuits. Consider a radio transmitter set to deliver the desired signal to noise at the receiver for a minimum talker to have a maximum peak capacity of 1 kw. If this transmitter is to carry a single talker channel of analog voltages from a normal talker universe, the peaks of the maximum volume talker must not exceed 1 kw more than 1 percent of the times. The mean talker power with 1 kw peak power will be at 6.3 watts.

A minimum talker will be at 6.3 watts down by 17 db. or 0.13 watt and is presumed to be received with a satisfactory signal to noise ratio. Now if all talkers were regulated to the minimum, all talkers would meet the desired signal to noise requirement and the peak power required is 20.0 watts instead of 1.0 kw, a reduction of 50 to 1 for the required performance. The peak load capacity required to transmit an analog speech signal is reduced 6 db. when the volume of the applied signal is regulated to the mean power of the initial talker universe. Load capacity is given in absolute power at 0 db. level for a fixed RMS at mean volume of the original distribution. Now, the power applied from a constant volume source is less by the factor 0.115 than for computer curves and the operating volume may be raised to the computer value. Further, the average volume applied to Bell Systems long distance communication circuits has decreased by about 4 db. since the initial systems were designed. Systems volume could be increased by the sum of the three factors of 14 db. If the regulated signal peaks were reduced by limiting to have their peaks clipped by 8 db. the volume could be increased a like amount for the same percent of the time overloading takes place.

In wire line circuits, the spacing of the repeaters can be increased by the proportion of span length which is represented by the increased volume a minimum talker is transmitted. That is, the minimum talker volume is raised to use the entire load capacity for a given percent overloading in order to deliver the signal to noise required.

What I claim is:

1. A voice communication system operating at a predetermined constant volume level comprising first transducer means to convert voice sounds to first representative electrical signals, said first representative electrical signals having an arbitrarily selected volume level, first hybrid means receiving said first representative electrical signal and providing an output therefrom at a preselected volume, a first adjustable attenuator, a first amplifier, said first adjustable attenuator and said first amplifier operating as a first combination receiving said output from said first hybrid means and operating to provide an output signal of preselected minimum volume, a first volume compression amplifier receiving the output of said first combination, said first volume compression amplifier operating to provide a predetermined constant volume signal therefrom, first means to limit the output peaks from said first volume compression amplifier, a first expandor receiving an output from said first limiting means, said first expandor operating automatically to insert loss into said communication system in the absence of said voice sounds, said first volume compression amplifier, first limiting means and first expandor being connected respectively and serially to provide a first series arrangement, a first transmission medium receiving the output from said first expandor, second hybrid means receiving a predetermined constant volume modified by the transmission signal from the output of said first transmission medium, a second transducer receiving the output from said second hybrid means for conversion to their representative voice sounds, a third transducer positioned with said second transducer and operating to convert voice sounds to second representative electrical signals having an arbitrarily selected volume level as said first representative electrical signals, a second adjustable attenuator, a second amplifier, said second adjustable attenuator and amplifier operating as a second combination receiving said second representative electrical signals by way of said second hybrid means and providing an output signal of preselected minimum volume, a second volume compression amplifier receiving the output of said second combination and operating to provide predetermined constant volume signal therefrom, second means to peak limit the output of said second volume compression amplifier, a second expandor receiving an output from said second limiting means, said second expandor also operating as said first voice expandor, said second compression amplifier, second limiting means, and second expandor being connected respectively and serially to provide a second series arrangement, a second transmission medium receiving the output of said second expandor, and a fourth transducer receiving the output of said second transmission medium by way of said first hybrid means for conversion to their representative voice sounds, said fourth transducer being positioned with said first transducer.

2. A voice communication system as described in claim 1 further including a third volume compression amplifier, a third expandor, said third volume compression amplifier and third expandor being connected respectively and serially to provide a third series arrangement with said third series arrangement being interposed between the output of said first transmission medium and said second hybrid means, a fourth volume compression amplifier, a fourth expandor, said fourth volume compression amplifier and fourth expandor being connected respectively and serially to provide a fourth series arrangement with said fourth series arrangement being interposed between the output of said second transmission medium and said first hybrid means.